April 2, 1963 R. A. BALDESCHWILER ET AL 3,083,848
CLAMP APPARATUS FOR WAGON GATES AND THE LIKE
Filed April 28, 1959
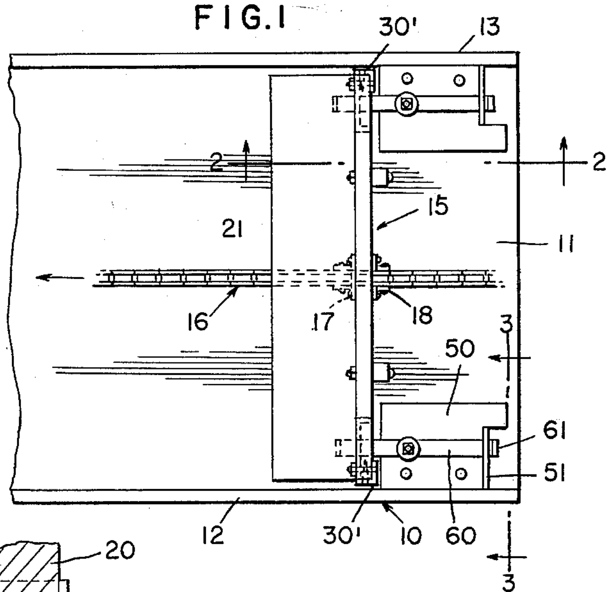
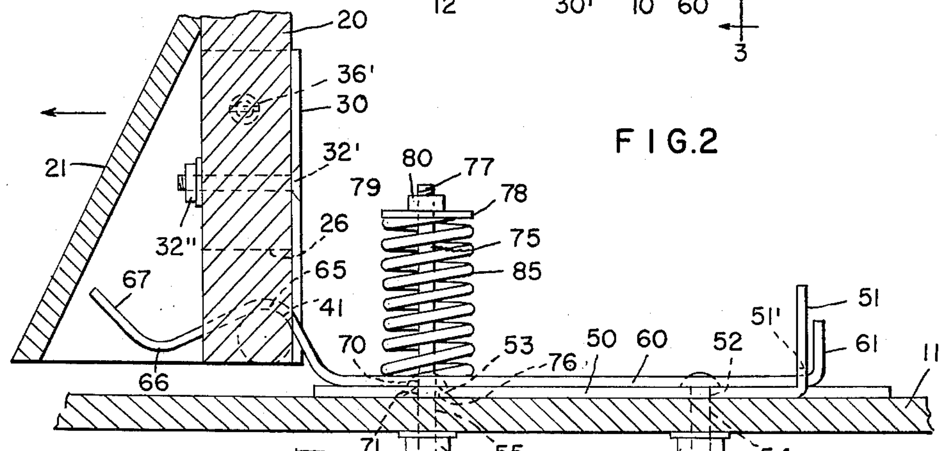
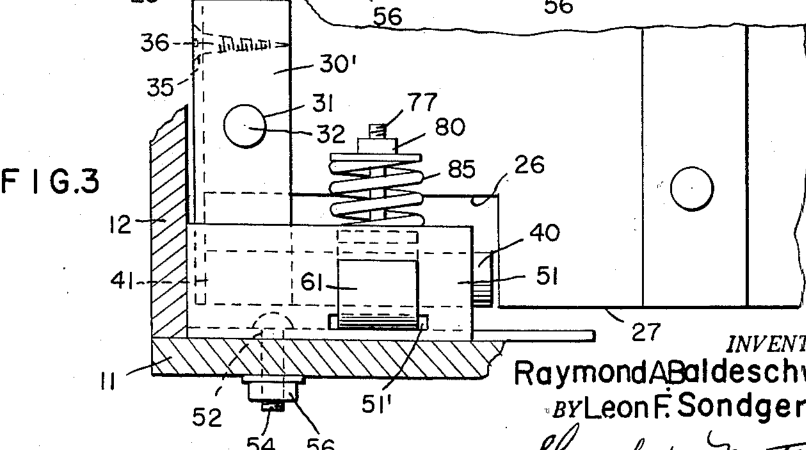
INVENTORS
Raymond A. Baldeschwiler
BY Leon F. Sondgeroth
Shoemaker & Mattare
ATTYS United States Patent Office 3,083,848 Patented Apr. 2, 1963

3,083,848

CLAMP APPARATUS FOR WAGON GATES AND THE LIKE

Raymond A. Baldeschwiler, Rte. 2, Thorp, Wis., and Leon F. Sondgeroth, Rte. 2, Mendota, Ill.

Filed Apr. 28, 1959, Ser. No. 809,558
1 Claim. (Cl. 214—82)

The present invention relates to a new and novel clamp apparatus for wagon gates and the like and is particularly adapted for maintaining such wagon gates in locked position when the wagon is empty.

Hay or silage chopper wagons as are conventionally used on farms and the like are often provided with a gate which is movably mounted upon the load supporting portion of the wagon and provided with means for selectively moving the gate from the front to the rear of the wagon. This rearward movement of the gate is employed for unloading the wagon as is well known in the art, and conventional driving means such as a chain drive is often utilized for moving the gate toward the rear of the wagon.

The gate is normally guided in its forward and rearward movement, the sides of the wagon being provided with strips on each side at the forward end thereof for limiting forward movement of the gate and preventing it from moving off the front of the wagon. This, of course, effectively limits the forward movement of the gate, but wagons as employed in the prior art fail to provide an effective means for maintaining the gate in this forward position. Of course, when the gate is moved to forward position and the wagon fully loaded, the load itself will tend to prevent the gate from moving toward the rear of the wagon.

After a wagon has been emptied, the gate is normally returned to the front position by the operator since at the unloading area, the usual rear gate of the wagon is wide open and it is a simple matter to enter the wagon and place the movable gate in its forward position. When the wagon is transported in its empty condition, the gate tends to slide to the rear of the wagon and usually binds at an intermediate point in the wagon. This tendency to travel to its rearward position is usually increased due to the jarring and bumping which these types of wagons are subjected to in normal use. In addition to the undesired binding which often occurs, it is necessary for the operator of the tractor drawing the wagon to again climb into the wagon and put the gate in its forward position before the wagon can be properly loaded.

It is accordingly evident that it is highly desirable to provide a simple and effective clamping means which will lock the movable gate of a wagon in its forward position and which will positively prevent undesired movement of such gates toward the rear of the wagon when transported in empty condition. This clamping means also is useful for locking the gate in position when it is not being used or during loading operations. At the same time, such clamping means must readily permit the gate to be moved rearwardly when it is desired to unload the wagon.

The novel structure for accomplishing the desired objects according to the present invention includes a pair of clamping means mounted at opposite sides of the forward end of the load supporting portion of a wagon adjacent the sides thereof. Each of these clamping means includes a base portion which is rigidly secured to the wagon and a locking arm which is pivotally mounted upon the base members. This locking arm is very effectively pivotally mounted by providing an upturned ear with the base member having a slot formed therein. The locking arm projects through the slot and includes an upturned end portion adjacent the slot for maintaining the locking arm in operative position.

The opposite end portion of the locking arm of each clamping means is provided with a downwardly facing arcuate locking surface and a reversely turned arcuate surface for guiding a latching means into locking position.

The locking arm is normally urged into locking position by means of a spring which is seated between the locking arm and a cap member which is connected to the base member by means of a stud. This spring means normally biases the locking arm in a downward direction to maintain it in locking position. The cooperating latching means is mounted on the sliding gate and includes a pair of laterally extending substantially cylindrical pins, these cylindrical pins being adapted to seat within the arcuate locking end portions of the locking arms for maintaining the gate in forward position. The pins are readily released from the locking arm by applying sufficient force to the gate in a longitudinal direction whereby the locking arm pivots in an upward direction against the force of the spring to release the pins from the locking arm.

The novel structural arrangement of the present invention is such that accidental or undesired motion of the gate in a rearward direction is positively prevented by the clamping means, and yet the gate may be readily released such that it can be moved in a rearward direction when it is desired to unload the wagon.

An object of the present invention is to provide a new and novel clamping apparatus for wagon gates and the like which positively prevents undesired movement of the wagon gate toward the rear of the wagon.

Another object is to provide a clamping apparatus for wagon gates and the like which is readily releasable when it is desired to unload the wagon.

A further object of the invention is to provide clamping apparatus which is extremely simple and compact in construction, and yet which is positive acting, sturdy, and reliable in operation.

Other objects and many attendant advantages of the present invention will become more apparent when considered in connection with the specification and accompanying drawing, wherein:

FIG. 1 is a plan view of the clamping apparatus mounted upon the forward end of a wagon;

FIG. 2 is a sectional view taken along line 2—2 of FIG. 1 looking in the direction of the arrows; and FIG. 3 is a sectional view taken along line 3—3 of FIG. 1 looking in the direction of the arrows.

Referring now to the drawing, wherein like reference characters designate corresponding parts throughout the several views, a hay wagon or the like indicated generally by reference numeral 10 includes a load supporting or bed portion 11 having side walls 12 and 13 extending along the opposite side edges thereof. A more or less conventional sliding gate 15 extends transversely of the hay wagon and extends to a point closely adjacent the opposite side walls. A conventional chain driving mechanism indicated by reference numeral 16 is suitably connected to the lower end portion of the sliding gate by means of clamping members 17 and 18 which are connected to the links of the chain and to the lower edge portion of the sliding gate. It is evident that actuation of the chain drive by a suitable operating mechanism (not shown) in a conventional manner serves to move the movable gate forwardly and rearwardly of the wagon.

The movable gate includes a vertically extending portion 20 and a lower angular rearwardly extending portion 21 supported by portion 20 and adapted to engage a load within the wagon for moving it in a rearward direction.

The movable gate forms no part of the present invention and is shown for the purpose of illustration, the gate being of a conventional construction and formed of wood planks or the like which may be bolted to a supporting frame. As seen in FIG. 3, one edge portion 25 of the lower end of the gate which may be a wood plank or the like is provided with a cut-out 26 extending between side edge 25 and the lower edge 27 of the gate. A channel member 30 formed of metal or similar material is provided with a pair of legs extending normally to one another and engaging the adjacent surfaces of the gate, one leg of the channel member being provided with an opening 31 receiving a bolt 32 therein which extends through the gate and has a bolt secured to the opposite end thereof. The other leg of the channel-shaped member is provided with an opening 35 including a screw 36 mounted therein and extending into the material of the gate for securing the channel member 30 in operative position at the bottom of the gate.

A substantially cylindrical pin 40 extends laterally of the lower end of the channel member, the end portion 41 being secured to the adjacent portions of the channel member by welding or the like for rigidly supporting pin 40 in position, the pin being constructed of relatively heavy metallic material.

It should be understood that an identical channel member and pin are mounted at the opposite lower edge side portion of the gate with the pin extending inwardly toward the pin shown in FIG. 3 such that the two pins supported at the lower outer edges of the gate extend inwardly toward one another. The opposite channel member 30' is seen in FIG. 2 with a bolt 32' extending therethrough and having a nut 32'' secured to the rearward end portion thereof for maintaining the channel member 35 in operative position. The opposite screw 36' is seen in dotted lines in FIG. 2.

Referring now to FIGS. 1–3, the clamping means includes a flattened base member 50 having an upturned integral ear 51 which has a slot 51' formed therein. The base member is also provided with a pair of openings 52 and 53 through which suitable attaching bolts 54 and 55 respectively extend, the lower end portions of the bolts having nuts 56 threaded thereon for securing the base member to the load supporting portion 11 of the wagon.

An elongated locking arm 60 extends through the slot 52 formed in ear 51 of the base member and has an integral upturned end portion 61 which serves to pivotally connect the locking arm with the base member and yet allows a limited degree of movement with respect thereto.

The opposite end portion of the locking arm includes a first arcuate portion 65 defining a downwardly facing arcuate surface, and a second arcuate portion 66 defining an upwardly extending arcuate portion.

It is evident that the construction is such that the cylindrical locking pins 41 mounted on the gate will first contact the outer end 67 of the locking arms as the gate is moved forwardly thereby forcing the locking arm in an upward direction after which the locking pins will move forwardly to the point where they are received within the arcuate locking portion 65 as shown in FIG. 2. It is apparent that when in this position, the locking arm will prevent rearward movement of the pin and the associated gate.

An intermediate portion of locking arm 60 is provided with an opening 70 and the base member 50 is provided with an aligned opening 71, a stud member 75 extending through these aligned openings and having an enlarged head 76 at the lower end thereof for limiting movement of the stud in an upward direction. The upper end 77 of the stud is threaded, a disc-like cap member 78 having a central opening 79 therein receiving the stud and a nut 80 being threaded on the threaded end portion 77 and engaging the upper surface of the cap member 78. A compression spring 85 is mounted about stud 75, the lower end of the spring engaging the upper surface of the locking arm, and the upper end of the spring engaging the undersurface of cap 78. It is apparent that the arrangement is such that spring 85 normally urges locking arm 60 in a downward direction whereby it positively locks the pins in clamped position as shown in FIG. 2 to prevent rearward movement of the gate.

When it is desired to move the gate in a rearward direction, actuation of the chain drive mechanism 16 will cause the gate to move rearwardly whereby pins 41 will cause locking arms 60 to pivot in an upward direction about a fulcrum defined by the slotted interconnection between the upturned ear of the base member and the locking arm.

It is apparent from the foregoing that there is provided a very simple, compact, sturdy, and reliable clamping means which incorporates a minimum of components and which acts in a positive manner to automatically lock a gate as it is moved forwardly into locking position and which will retain the gate in such locking position when the wagon is not being used or when the wagon is transported in empty condition.

When it is desired to unload the wagon or for any other reason move the gate in a rearward direction, the chain drive mechanism is actuated, whereupon the clamping means will automatically release.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form its functional as well as conjointly cooperative equivalents are therefore intended to be embraced by the claim.

We claim:

In combination, a wagon having a load-supporting portion, said wagon including a forward end and a rearward end, said rearward end being adapted to unloading a load supported on the wagon, gate means mounted on said load-supporting portion and movable longitudinally with respect thereto, means for moving said gate with respect to the load-supporting portion and clamping means for locking said gate in a forward position, said clamping means being supported in fixed position upon said load-supporting portion adjacent the forward end thereof and adjacent opposite sides thereof, each of said clamping means comprising a base member having a flat major portion adapted to be mounted upon the flat load-supporting surface of a wagon, said base member including an integral ear formed at one end of said major portion thereof and extending substantially normally to said major portion, said ear extending from said major portion a distance which is substantially less than the longitudinal dimension of said major portion, said ear having an elongated slot formed through the lower portion thereof, the lower edge of said slot extending substantially flush with the upper surface of said major portion, an elongated locking arm including a central flat portion, the under surface of which is normally positioned in abutting relationship with the upper surface of the major portion of said base member, the flat intermediate portion of said locking arm extending through said slot and having an integral upturned end portion extending substantially normally to said intermediate portion and normally positioned substantially parallel with said ear, the opposite end of said locking arm including a first downwardly facing arcuate surface forming a locking portion and an integral upwardly extending arcuate portion for guiding a latching means into locking engagement with said locking portion, and a resilient spring means engaging the upper surface of the intermediate portion of said locking arm and extending substantially normally thereto for continuously urging the locking arm toward said base member to maintain the locking arm in locking position.

References Cited in the file of this patent

UNITED STATES PATENTS

| | | |
|---|---|---|
| 360,493 | Wagner | Apr. 5, 1887 |
| 394,774 | Kling | Dec. 18, 1888 |
| 1,197,021 | Gadecki | Sept. 5, 1916 |
| 1,380,158 | Reisch | May 31, 1921 |
| 2,218,121 | Paiement | Oct. 15, 1940 |
| 2,495,358 | Wengert | Jan. 24, 1950 |
| 2,504,540 | Lawless | Apr. 18, 1950 |
| 2,530,350 | Ehlert | Nov. 14, 1950 |
| 2,671,673 | Benson | Mar. 9, 1954 |
| 2,803,357 | Ronfeldt | Aug. 20, 1957 |